(12) United States Patent
Herrmann et al.

(10) Patent No.: US 7,054,932 B2
(45) Date of Patent: May 30, 2006

(54) SCALABLE MONITORING METHOD AND DEVICE

(75) Inventors: Marc Herrmann, Saint Etienne de Crossey (FR); Xiaobo Li, Puteaux (FR)

(73) Assignee: BULL, S.A., Louveciennes (FR)

( * ) Notice: Subject to any disclaimer, the term of this patent is extended or adjusted under 35 U.S.C. 154(b) by 811 days.

(21) Appl. No.: 09/736,304

(22) Filed: Dec. 15, 2000

(65) Prior Publication Data

US 2001/0032259 A1  Oct. 18, 2001

(30) Foreign Application Priority Data

Dec. 16, 1999  (FR) .................................. 99 15894

(51) Int. Cl.
*G06F 15/173* (2006.01)
(52) U.S. Cl. .................. 709/226; 709/223; 709/227; 709/234; 705/1; 707/9
(58) Field of Classification Search ................ 709/223, 709/224, 225, 226, 227, 239
See application file for complete search history.

(56) References Cited

U.S. PATENT DOCUMENTS

| | | | |
|---|---|---|---|
| 5,204,955 A | | 4/1993 | Kagei et al. |
| 5,651,006 A | * | 7/1997 | Fujino et al. ................ 370/408 |
| 5,774,669 A | | 6/1998 | George et al. |
| 6,571,286 B1 | * | 5/2003 | Fisher et al. ................ 709/224 |

OTHER PUBLICATIONS

Z. Liang, Y. Sun, C. Wang—ClusterProbe: An Open, Flexible and Scalable Cluster Monitoring Tool,—Dec. 2, 1999—pp. 261-268.

J. Yang, P. Wang, J. Wu—A Scalable, Web-based Architecture for Hierarchical Network Management—Dec. 5, 1999—pp. 1882-1888.

* cited by examiner

*Primary Examiner*—Jason Cardone
*Assistant Examiner*—Adnan M. Mirza
(74) *Attorney, Agent, or Firm*—Miles & Stockbridge P.C.; Edward J. Kondracki (57) ABSTRACT

The present invention relates to a method and device for the scalable monitoring of a computer system comprising a plurality of computer units constituting hardware resources to be monitored forming a monitored domain, the method being implemented by means of a central computer system called a manager connected to a communication network that allows the transfer of information between at least one resource and the manager. The method comprises a step for organizing the monitored domain into monitored subdomains comprising a predetermined maximum number of resources, and a step for automatically creating and configuring, for each subdomain, an information synthesis node comprising at least one synthesis agent stored in the storage means of a resource. Each synthesis agent is designed to synthesize indicator values calculated and stored in the storage means of at least one resource. These indicators represent an operational status of the resources of the subdomain and are evaluated by indicator agents installed in these resources. Each indicator agent is uniquely identified by the name of the indicator it calculates and by the subdomain in which it is installed, and is associated with each synthesis agent using the corresponding indicator value. A further step allows for modifying the associations between the synthesis agents and the indicator agents when the predetermined maximum number of resources in a subdomain is reached, in order to accommodate the addition or deletion of indicators so that the new architecture of the monitored domain comprises, in each subdomain, a number of resources lower than the predetermined maximum number of resources.

33 Claims, 3 Drawing Sheets

SCALABLE MONITORING METHOD AND DEVICE

CROSS REFERENCE TO RELATED APPLICATION

The subject matter of this invention is related to application Ser. No. 09/737,919, corresponding to French Application 99/15892 (BULL 3866-T2153-906756) filed concurrently herewith in the named Mark Herrmann and Xiabo Li and entitled "Method and Device for Deploying A Distributed Monitoring". The subject matter of said application is hereby incorporated by reference.

FIELD OF THE INVENTION

The present invention relates to a method and device for the scalable monitoring of a running computer system. The computer system is constituted by a set of computer equipment units called distributed resources, each being interconnected to the others through a communication network.

DESCRIPTION OF RELATED ART

Large companies have an increasing number of units of computer equipment to manage. These units, connected to one another through a communication network called a local area network (LAN), are managed by a manager. In order to manage (supervise, act on, monitor, control) these units remotely from one point, an architectural model comprising a manager and an agent, for example of the SNMP type, is most commonly adopted. In this architectural model, the (SNMP) agents implemented in the equipment units of the network inform the manager of the status of each of the units managed. In the vast majority of cases, this manager manages several thousand units of distributed equipment in one or several countries.

In order to characterize the behavior of a set of resources interconnected through a network, any monitoring method synthesizes, and therefore calculates values known as indicators, which make it possible to characterize the operation and the status of these resources. The calculation of an indicator is performed by an agent called an "indicator agent," which periodically calculates a value resulting from a function that combines values measured by means of an SNMP or CMIP protocol layer with values calculated by other indicator agents.

Traditionally, this monitoring is performed by the manager, which centralizes the acquisition of the measurements and the calculation of the indicators. The information exchanged between the manager and the resources flows through a wide area network, also called a "WAN." However, the cost of bandwidth in the WAN is not adapted to monitoring. Likewise, the exchanges of information involved in centralized monitoring generate heavy usage of the WAN. This problem is explained by the fact that the bandwidth of the WAN is too small for the ever-increasing amount of information that must pass between the managers and their equipment.

SUMMARY OF THE INVENTION

The object of the present invention is to eliminate the drawbacks of the prior art by offering a scalable monitoring method that makes it easy to reorganize the architecture of the computer system when it changes. Therefore, the object of the present invention is to eliminate the drawbacks of the prior art by offering a scalable monitoring method that makes it easy to reorganize the architecture of the computer system when it changes.

This object is achieved through the fact that the method for the scalable monitoring of a computer system comprising a plurality of computer equipment units constituting hardware resources to be monitored forming a monitored domain, the method being implemented by means of a central computer system called a manager connected to a communication network that allows the transfer of information between at least one resource and the manager, is characterized in that it comprises:

a step for breaking down the monitored domain or organizing a plularity of into monitored subdomains (d1, d2) comprising a predetermined maximum number of resources, (A1, A2, B1, B2)

a step for automatically creating and configuring, for each subdomain, an information synthesis node comprising at least one synthesis agent stored in the storage means of a resource; each synthesis agent is designed to synthesize indicator values calculated and stored in the storage means of at least one resource, these indicators representing an operational status of the resources of the subdomain and being evaluated by indicator agents installed in these resources, each indicator agent being uniquely identified by the name of the indicator it calculates and by the subdomain in which it is installed and being associated with each synthesis agent using the corresponding indicator value, a step for modifying the associations between the synthesis agents and the indicator agents when the predetermined maximum number of resources in a subdomain is reached, in order to accommodate the addition or deletion of indicators so that the new architecture of the monitored domain comprises, in each subdomain, a number of resources lower than the predetermined maximum number of resources.

According to another characteristic, the step for configuring a synthesis node comprises, for each synthesis agent:

a step for searching, in a table stored in the storage means of a resource, for the name of the indicator agent or agents required to calculate the indicator of the synthesis agent a step for the subscribing the synthesis agent to the indicator agents found during the search step, this subscription step allowing each synthesis agent to automatically receive, in its subscription table stored in the storage means of a resource, the new values of the indicators found.

According to another characteristic, the search step comprises:

a step for the sending by the synthesis agent of a notification to a naming service dedicated to storing the associations between a subdomain name, an indicator agent and an indicator, this notification comprising the name of a given subdomain and a given indicator.

According to another characteristic, the modification step comprises:

a step for installing at least one indicator agent in each new resource added to a subdomain, a step for sending, to the synthesis agents requiring the value of the indicator of the new indicator agent or agents, a notification comprising the identification of the new indicator agent or agents, a step for subscribing each synthesis agent to the new indicator agents required to calculate the indicator of the synthesis agent.

According to another characteristic, the modification step comprises:

a step for selecting, for each subdomain, the resources to be deleted a step for sending, to the synthesis agents using the value of the indicator of the indicator agent or agents installed in the selected resource or resources, a notification comprising the identification of the deleted indicator agent or agents a step for unsubscribing the synthesis agents from the indicator agents whose indications are contained in the notification.

According to another characteristic, the maximum number of resources per subdomain is determined either so that the cost of calculating the indicators is as low as possible, or so that the number of synthesis nodes is as low as possible.

A second object of the invention consists of offering a scalable monitoring device that makes it easy to reorganize the architecture of the monitoring system when the size of the monitored domain, i.e. the number of elements to be monitored, changes.

This object is achieved through the fact that the device for the scalable monitoring of a computer system comprising a plurality of computer equipment units constituting hardware resources to be monitored forming a monitored domain is characterized in that it comprises mans for breaking the monitored domain down into monitored subdomains comprising a predetermined maximum number of resources, means for creating and configuring, in the storage means of a resource, information synthesis nodes comprising at least one synthesis agent stored in the storage means of at least one resource and designed to synthesize indicator values calculated and stored in the storage means of a resource, these indicators representing an operational status of the resources of the subdomain and being evaluated by indicator agents installed in these resources, each indicator agent being uniquely identified by the name of the indicator it calculates and by the subdomain in which it is installed, the configuration of a synthesis agent comprising the storage, in the storage means of a resource, of the associations between the synthesis agent and indicator agents, means for modifying the associations between the synthesis agents and the indicator agents when the predetermined maximum number of resources in a subdomain is reached, so that the new architecture of the monitored domain comprises, in each subdomain, a number of resources lower than the predetermined maximum number of resources.

According to another characteristic, the means for configuring a synthesis node comprise means for searching, in a table stored in the storage means of a resource, for the name of the indicator agent or agents required to calculate the indicator of the synthesis agent, and means for subscribing the synthesis agent to the indicator agents found during the search step, these subscription means allowing each synthesis agent to automatically receive, in its subscription table stored in the storage means, the new values of the indicators found.

According to another characteristic, the search means comprise means for the sending by the synthesis agent of a notification to a naming service dedicated to storing, in a table stored in the storage means of a resource, the associations between subdomain name, an indicator agent and an indicator, this notification comprising the name of a given subdomain and a given indicator, and means for the sending by the naming service of a notification to the requesting synthesis agent, comprising the name of the indicator agent or agents corresponding to the association of the given subdomain and the given indicator.

According to another characteristic, the modification means comprise means for creating and storing at least one indicator agent in each new resource added to a subdomain, means for sending, to the synthesis agents requiring the value of the indicator of the new indicator agent or agents, a notification comprising the identification of the new indicator agents or agents, means for subscribing each synthesis agent to the new indicator agents required to calculate the indicator of the synthesis agent.

According to another characteristic, the modification means comprise means for selecting, for each subdomain of the resources to be deleted, means for sending, to the synthesis agents using the value of the indicator of the indicator agent or agents installed in the selected resource or resources, a notification comprising the identification of the deleted indicator agent or agents, and means for unsubscribing the synthesis agents from the indicator agents whose identifications are contained in the notification.

According to another characteristic, the maximum number of resources per subdomain is determined either so that the cost of calculating the indicators is as low as possible, or so that the number of synthesis nodes is as low as possible.

Other characteristics and advantages of the present invention will emerge more clearly through the reading of the following description, given in reference to the attached drawings, in which:

DESCRIPTION OF THE INVENTIVE EMBODIMENTS

As explained above, a computer system (1) comprises at least one local area network (LAN) (10, 20) that communicates with a central system (2) or manager through a wide area network (3). Each local area network (10, 20) comprises at least one unit of computer equipment (101, 102, 201, 202) called a resource.

In the prior art, the monitoring of all the resources (101, 102, 201, 202) is handled by means of remote agents (SNMP or CMIP agents, depending on the management protocol in question) installed in each resource (101, 102, 201, 202). These agents allow a manager to collect information on the resources (101, 102, 201, 202) by measuring given parameters, for example by sending an SNMP request GetRequest to the SNMP agent in question, then to transmit the collected information to the manager (2) by means of a request, for example GetResponse in the SNMP world. The manager (2) then evaluates the indicators from this received information. It is understood that all the requests sent by the manager (2) in order to gather monitoring information and the responses to these requests from the agents produces considerable congestion in the wide area network (3), consequently diminishing its performance.

According to the invention, all or part of the evaluation of the indicators is distributed at the local area network level (10, 20) to indicator agents.

To do this, for each indicator ($I_n$) characterizing a particular operation or status of a resource (101, 102, 201, 202), a specific indicator agent (A1, A2, B1, B2) is installed in the resource (101, 102, 201, 202). In the exemplary embodiment represented in FIG. 1, each agent (A1, A2, B1, B2) is responsible for evaluating a different indicator ($I_n$). In other words, each indicator ($I_n$) makes it possible to determine a different operation or a different status in each resource (101, 102, 201, 202). However, each agent (A1, A2, B1, B2) described in reference to FIG. 1 can be present, for example, in all of the resources (101, 102, 201, 202) or all the resources of the same type in the computer system (1).

For example, a first agent (A1) can evaluate an indicator ($I_{A1}$) whose formula makes it possible to know, for example, the number of alarms per minute emitted by a first resource (101). It is understood that this agent (A1) can be installed in all the resources (101, 102, 201, 202) of a computer system (1).

The indicator agents (A1, A2, B1, B2) are elementary programming and execution entities. The indicator agents (A1, A2, B1, B2) are autonomous in order to give the structure the property of scalability by making it easy to add or delete one or several indicator agents in the architecture. They are made autonomous by correctly defining the interface for these agents. They are also autonomous in terms of communication. They communicate using notifications and not procedure calls, which makes it possible to open up the architecture. This communication is asynchronous, thereby making it possible to obtain a better parallelization of the indicator agents and hence a better scalability of the architecture.

The indicator agents (A1, A2, B1, B2) can be persistent objects, and their status is derived from data that, in this case, can exist outside any execution structure and can be stored in persistent E²PROM or hard disk memories. An indicator agent (A1, A2, B1, B2) is an independent machine that reacts to notifications.

Each agent (A1, A2, B1, B2) is an object of a class and is identified by a respective identifier $id_{(A1)}$, $id_{(A2)}$, $id_{(B1)}$, $id_{(B2)}$ that is unique in the computer system (1) so that communications between indicator agents are possible, and that makes it possible to locate them. An agent can be created in a remote server. The creation entity is responsible for creating the identifier. The structure of the identifier must take into account the static location of the agents in order to allow the system to forward the notifications, and to allow local "production" of the identifiers for the remote agents. The identifier of an agent comprises the following three parts:

the identification (idsac) of the agent server hosting the creation agent, the identification (idsal) of the agent server hosting the agent created, and a postmark (el), local to the agent server hosting the creation agent.

A "factory" agent is present in all of the agent servers and is responsible for creating objects in the server It makes it possible to manage the creation of remote agents.

According to the invention, each indicator agent (A1, A2, B1, B2) is responsible for evaluating one indicator ($I_n$). In order to do this, it must comprise properties that make it possible to collect a measurement ($M_n$) on the resource (101, 102, 201, 202) with which it is associated, and communication properties in order to request or receive, as necessary, at least one other indicator evaluated by another indicator agent (A1, A2, B1, B2) according to the invention, for example by means of notifications. These properties are obtained by means of specific program modules constituting each indicator agent (A1, A2, B1, B2). Thus, an indicator agent (A1, A2, B1, B2) comprises a collection module and/or a communication module. Likewise, an indicator agent (A1, A2, B1, B2) also comprises an evaluation module for calculating the indicator itself from the formula, using the information collected by the other two modules. In this evaluation module, the equation that defines the value of an indicator ($I_{A1}$ for example) can refer to a possibly empty set of other indicators ($I_{A2}$, $I_{B1}$, for example). The indicator agents according to the invention use a communication protocol that is preferably asynchronous, which means that when an indicator agent sends a request for collecting a measurement on a resource of the system or a notification to another indicator agent, it does not wait for the response to this request or notification before possibly sending a new request or notification. In other words, the sending of requests and notifications is performed in parallel. Likewise, the management protocol can be asynchronous. For example, the asynchronous management protocol used is the protocol SNMP or the protocol CMIP, and it makes it possible to parallelize the acquisition of the data and the calculation of the indicators for which the data is available.

However, it is possible to use a synchronous protocol, but the performance in that case is inferior, particularly in terms of speed in evaluating the indicators. Moreover, it is appropriate to install an asynchronous device for collecting and storing measurements so that the indicator agent that sent the request need only consult the memory of this measurement collecting device. This device is, for example, a particular management information base (MIB), called an Rmon MIB by one skilled in the art.

Each indicator agent manages a so-called subscriber list on which the names of other indicator agents according to the invention may be written. This list is stored in the storage means or memory of the computer equipment unit associated with the indicator agent, for example in the form of a table (1010, 2010). An indicator agent $A_1$ is written on this list by sending a specific so-called subscription notification "Subscribe (id($A_1$) Management Information ($A_1$))" to another indicator agent $B_1$, which calculates the indicator ($I_{B1}$). This notification includes as parameters a piece of so-called management information that allows the sending agent to create an association between a propagation of a value modification and the other indicator agent ($B_1$), and the identifier $id_{(A1)}$. Upon receiving a subscription notification, the destination agent (B1) processes the notification by writing into the subscriber table (2010) the identifier ($Id_{A1}$) of the sending agent as well as the management information (Management Information ($A_1$)) on the list. This list is consulted by the indicator agent ($B_1$) that manages it, after the evaluation of the indicator ($I_{B1}$) by the agent ($B_1$). If the new value of the indicator is different from the value previously evaluated and stored by the agent, then the agent sends each agent written on the subscriber list (2010) and identified by the parameter ($id_{(A1)}$) a value change notification (ValueChanged) comprising the new value (Val($I_{B1}$)) of the indicator ($I_{B1}$). To do this, after the evaluation of the indicator ($I_{B1}$), a comparison module of the indicator agent ($B_1$) compares the new value of the indicator (Val($I_{B1}$)) to the value previously calculated (Valp($I_{B1}$)) and stored. If the two values are different, the comparison module activates a procedure for sending the value change notification (ValueChanged) to all of the agents, for example A, written on the subscriber list (2010) then records the new value of the indicator in the storage means of its computer equipment unit. The value change notification comprises as parameters the new value of the indicator (Val($I_{B1}$)) and the management information (Management Information ($A_1$)) of the target agent, so that the target agent can assign the value received to the indicator awaited.

According to the invention, the monitored domain constituted by the set of resources (101, 102, 201, 202) is organized into a plurality of subdomains ($d_1=\{A_1, A_2\}$; $d_2=\{B_1, B_2\}$). Each of the subdomains contains either a set of resources to be monitored, and/or a set of subdomains.

A subdomain is also characterized by the indicator agents running in the resources constituting the subdomain. For each subdomain, a set of agents called "synthesis agents" is installed in a particular resource so as to constitute a synthesis node. This resource can be a dedicated monitoring resource or a general-purpose resource chosen because of its technical characteristics to support the synthesis node. Moreover, this resource could also be a given resource of the subdomain or of another subdomain. In fact, one resource can support the monitoring of several subdomains, for example ranging from 0 to n, if this resource is capable of handling the load produced by the calculations performed by a plurality of sets of synthesis agents.

Basically, the structure of a synthesis agent is identical to that of an indicator agent; the difference in terms of behavior and utilization lies mainly in the formula representing the indicator to be evaluated.

During the configuration of the monitoring of the monitored domain according to the invention, a naming service is used to define and maintain the associations between the name of the subdomain and the identification of the indicator agent responsible for evaluating an indicator of the subdomain.

Figure 1:
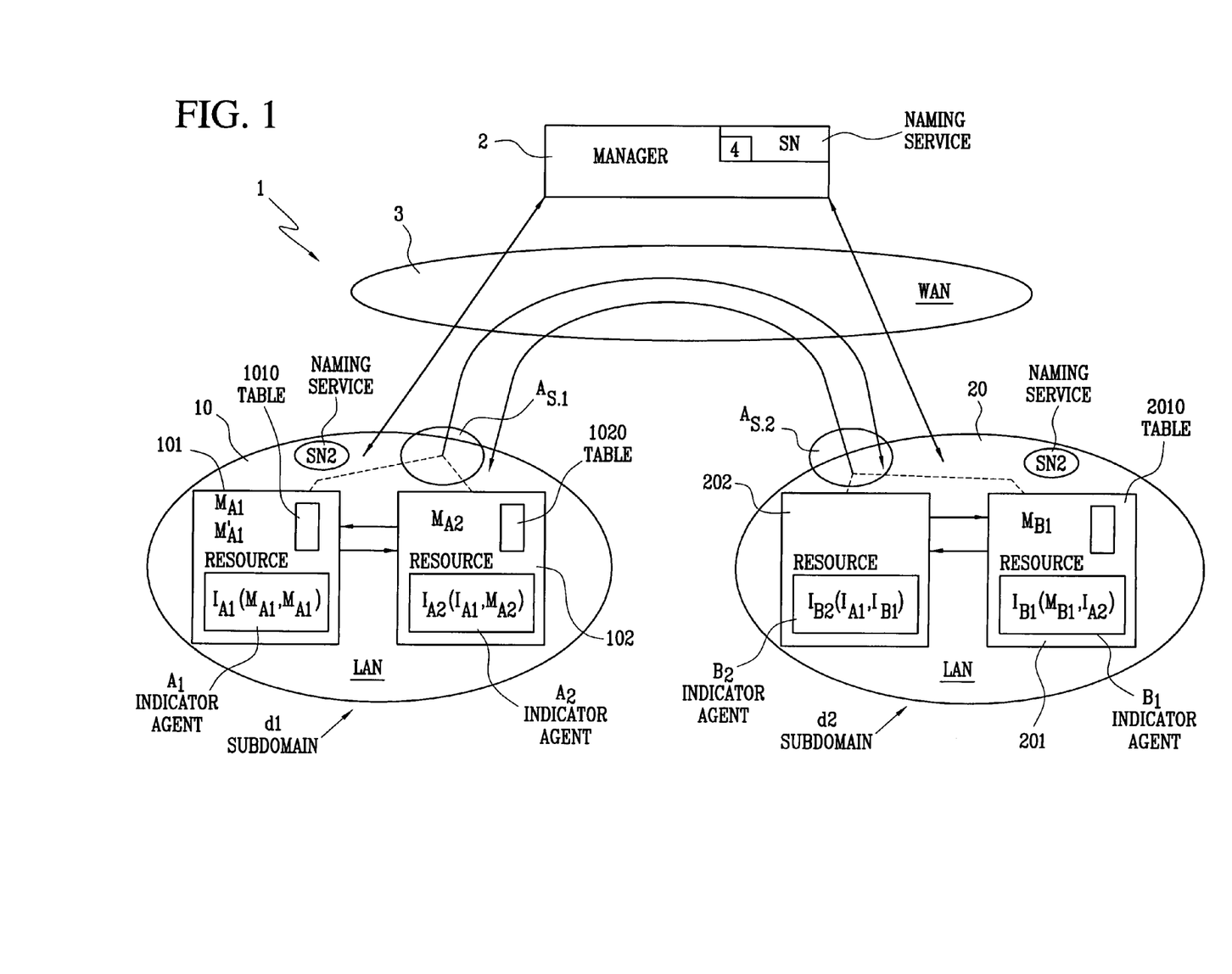
FIG. 1 represents a simplified schema of a computer system in which the method according to the invention can be applied.

In other words, the naming service (SN) supplies, for each subdomain, all of the indicator agents present in this subdomain and associates each indicator agent ($A_1$) with the indicator ($I_{a1}$) it calculates and with the subdomain (d1) to which it belongs, for example in a table (4) or in an association file. This naming service SN is then used during the configuration of each synthesis agent. This naming service can be either centralized or distributed. When the naming service is centralized, as represented in FIG. 1, the information relative to the association between a subdomain and an indicator agent is centralized in a single place in the monitored domain represented, for example, by a resource of the monitored domain.

When the naming service is distributed, the naming service associated with each agent machine has the names of the agents it manages, as well as the subdomain to which each agent belongs.

The agent machine manages a certain number of properties, i.e. the atomic aspect of an agent's reaction to a notification and the delivery of the notifications in a causal sending order.

The agent machine handles the distribution of the notifications, the transmission of the notifications and the management of the overall atomicity. The agent machine comprises various entities such as an execution engine and a communication channel, this channel having two queues, a local queue and an external queue.

The agent machine is distributed. The agent machines communicate with each other; the agents do not see this distribution since they communicate through notifications and address their local agent machine. An agent's reaction is always local.

The centralized or distributed naming service SN is necessary for the configuration of the synthesis agents ($A_S$). In essence, as a general rule, a synthesis agent is designed to evaluate an indicator whose formula includes at least one set-oriented operator such as a sum, an average, or the determination of a minimum or a maximum in one or more indicators of the subdomain with which the synthesis agent is associated. However, a synthesis agent can also evaluate an indicator representing the general operation of the subdomain with which it is associated.

Thus, the configuration of a synthesis agent requires the latter to subscribe to all the indicator agents of the subdomain monitored by the synthesis agent that evaluate the indicator or indicators contained in the formula of the indicator of the synthesis agent. To do this, the synthesis agent ($A_S$) sends the naming service (SN), for each indicator required for the evaluation of its own indicator, a notification requesting an indicator lookup (indicatorLookupReq) that specifies the name of the subdomain (d1) that the synthesis agent ($A_S$) monitors, as well as the names of the indicators required for the evaluation of its own indicator. In response to this notification, the naming service performs a search in order to find the names of all the agents that perform the evaluation of the requested indicator in the subdomain specified in the notification. The naming service constructs and then sends a response notification (indicatorLookupResp) to the requesting synthesis agent containing the name of the domain (d1) and the name of the indicator agent or agents (A1, A2), if they exist. This response notification is processed by the synthesis agent, which extracts the names of the indicator agents and activates, for each indicator agent extracted, the subscription procedure described above.

In a variant of embodiment, when no indicator agent corresponding to the subdomain name/indicator name association exists, the naming service can include means for storing the name of the synthesis agent that sent the notification and the name of the indicator requested. Thus, as soon as a new indicator agent is installed in the subdomain, it is detected by the detection means of the naming service (SN) or is declared to the latter by the installer. The naming service includes means for performing an update of the subdomain name/indicator name associations and for verifying whether the name of the indicator corresponds to a stored indicator name. If so, means in the naming service construct, then send, the response notification (indicatorLookupResp) to the agents whose names have been previously stored that have requested the name of the agent responsible for the new indicator detected.

In another variant, the naming service uses an agent creation tool, such as an agent machine, to construct the agent requested. In other words, the naming service constructs an indicator agent that evaluates the requested indicator in the specified subdomain.

According to the invention, the number of resources per subdomain is lower than a predetermined maximum number. This number is determined as a function of the monitoring policy chosen. For example, the maximum number of resources per machine is determined so that the cost of calculating the indicators of the synthesis agents is as low as possible, in order to reduce the calculation load in the resource or resources supporting the synthesis agents. Another possibility consists of determining the maximum number of resources per domain so that the number of synthesis nodes is as low as possible, in order to reduce the number of resources responsible for monitoring and to concentrate the information representing the monitoring.

Figure 3:
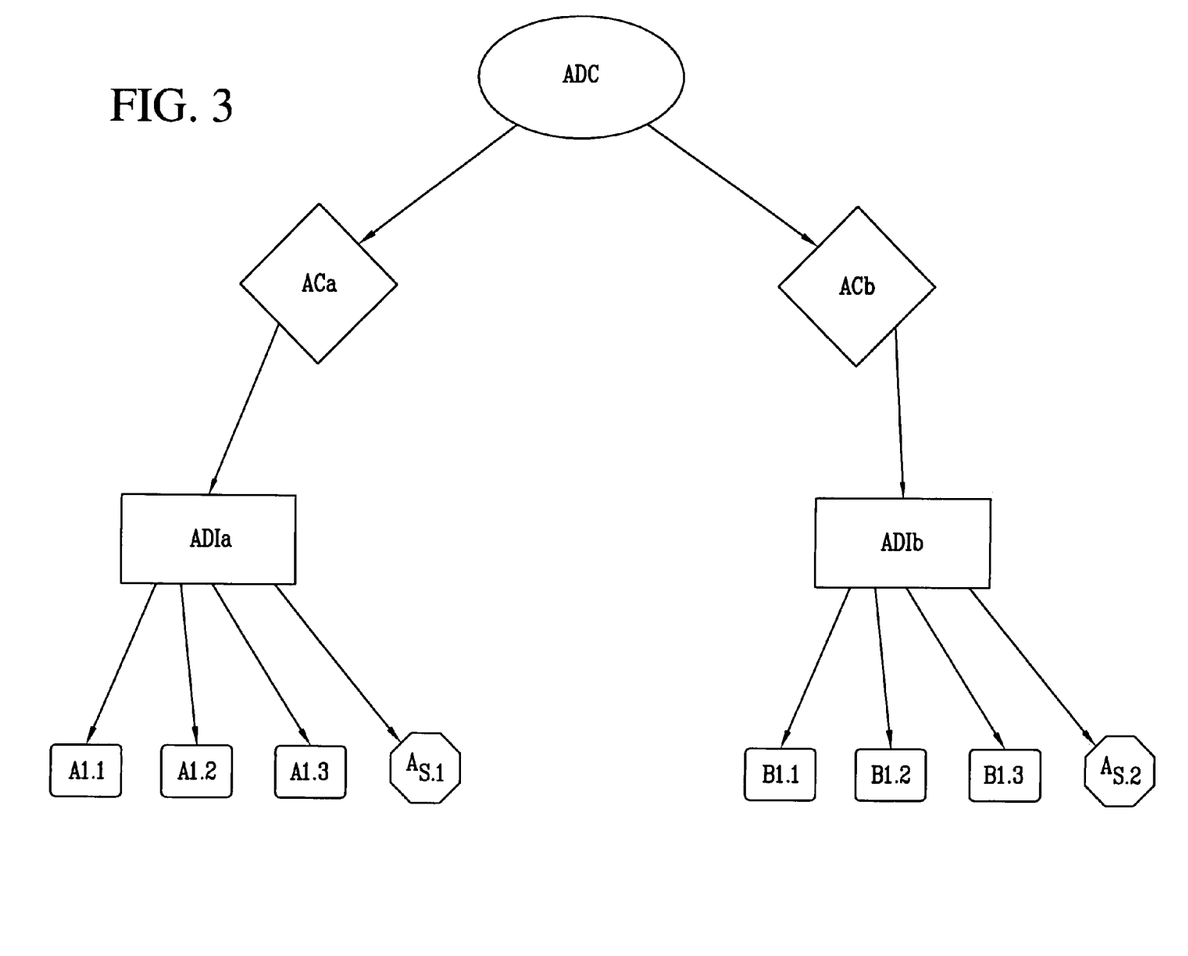
FIG. 3 represents the process for deploying a monitoring method according to the invention.

Before further describing the mechanisms that make it possible to reorganize the architecture of the monitoring according to the invention, we will describe, in reference to FIG. 3, the method that makes it possible to deploy a monitoring configuration.

The deployment of a monitoring configuration consists of performing the instantiation, i.e. the creation, of the indicator agents for the indicators defined by the list {(d1.I1), ..., (di.Ij), . . . , (dn.In)}, in which the indicator Ij must be evaluated in the subdomain di. To do this, the deployment method uses an agent called a configuration deployment agent (ADC). This configuration deployment agent handles the creation of agents called configuration agents (AC). Thus, for each resource of a monitored subdomain, the configuration deployment agent (ADC) creates a configuration agent (ACa, ACb), which handles the process of creating the indicator agents ($A_i$, $B_i$, $C_i$) specified by the configuration for the resource that has been assigned to it. Thus, the deployment of the various configurations is parallelized in each of the subdomains to be monitored. In essence, the configuration deployment agents are created for each subdomain to be monitored in parallel fashion.

The configuration deployment agents (ADC) and the configuration agents (AC) have the same characteristics as the indicator agents, i.e. they are also managed by at least one agent machine of at least one resource of the domain to be monitored. The location of the configuration agents is of little importance; the various configuration agents can reside in the same resource or can be deployed in different resources, including even monitored resources.

As explained above, a configuration agent (AC) handles the creation of the indicator agents specified by the configuration for a given resource M belonging to at least one of the subdomains (di) for which this indicator $I_n$ must be created. To this end, for any indicator $I_n$ of the configuration that can be instantiated in the resource M, the configuration agent creates an agent called an indicator deployment agent ($ADI_a$, $ADI_b$, FIG. 2) responsible for the deployment of the indicator or indicators I in the resource M.

The indicator deployment agent (ADI) can be created in the same resource as the configuration agent (AC) or in a different resource.

In a variant of embodiment in which the programming language used is the "Java" language, the configuration agents (AC) will induce the dynamic loading of the classes "I_Deployer" and "I_Indicator", using the mechanisms defined by Java runtime. When these classes are not present in the resource in which the configuration process is executed, the configuration agent receives an exception of the "class not found" type "ClassNotFoundException", which activates, at the configuration agent level, means for downloading the software elements it requires in the resource, thereby incrementally deploying the software elements required for the monitoring, from a minimal kernel. Thus, the monitoring method according to the invention provides a solution to the dual problem of configuring a distributed monitoring, i.e., deploying the software configuration and configuring the monitoring.

An indicator deployment agent (ADI) is an agent that determines, for a given type of indicator, the various combinations of the values of the variables for which the indicator will be instantiated. It therefore handles both the name resolution process (described below) and the creation of the indicator agents, as well as their declaration to the naming service (SN).

The names of the objects referenced by the indicator agent that calculates the indicators, as well as the identifications of the agents that calculate the indicators referenced during the calculation, are part of the parameters for the creation of any indicator agent during its instantiation by the indicator deployment agent.

For any indicator $I_n$, an indicator compiler, after analyzing the equation that defines the indicator, generates two object classes "I_Deployer" and "I_Indicator", which respectively correspond to the indicator deployment agents that deploy the instances of the class "I_Indicator" responsible for evaluating the indicator and to the indicator agents that evaluate the indicator. The class "I_Deployer" makes it possible to know which indicator agents identified by the class "I_Indicator" must be created, and makes it possible to declare to the naming service (SN) the indicator agents actually created.

An indicator deployment agent has explicit knowledge of the indicators and the identifiers of the objects referenced by the equation. Each of these object identifiers $\{Id_1, \ldots, Id_m\}$ defines a structure wherein certain elements can be variables.

When the management protocol chosen is the protocol SNMP, the indicator deployment agent executes the process (described below) for resolving the names of the objects referenced in the equation or the formula of the indicator and creates the corresponding indicator agents by determining the valid combinations of the values of the variables.

In essence, the equation that defines the calculation of the value of an indicator refers to objects identified by $\{Id_1, \ldots, Id_m\}$ using a possibly empty set of variables $\{V_1, \ldots, V_n\}$. Each object identifier $Id_i$ is associated with a set of variables $\{W_1, \ldots W_k\}$ belonging to the set $\{V_1, \ldots, V_n\}$. Determining the first valid combination of the values of the variables $V_i$ consists of applying a process (described below) for searching through the identifiers $Id_i$, for example in the order 1 through m, in order to progressively instantiate all the variables $\{V_1, \ldots, V_n\}$ and hence to calculate the identifiers $\{Id_1, \ldots, Id_m\}$.

When all of the objects identified by $\{Id_1, \ldots, Id_m\}$ in which the variables have been replaced with their corresponding values belonging to the combination of values $\{V_1, \ldots, V_n\}$ exist, the search process of the indicator deployment agent (ADI) verifies whether or not the constraint expressed in the values of the variables is satisfied. The indicator deployment agent (ADI) instantiates the indicator agent only when this last constraint is met. The objects actually referenced by the equation of the indicator are those identified by $\{Id_1, \ldots, Id_m\}$ in which the variables have been replaced by their corresponding values belonging to the combination of values $\{V_1, \ldots, V_n\}$. These objects are passed to the indicator agent as a parameters during the creation of the indicator agent.

In order to find the subsequent valid combinations of the variables Vi, the search process of the indicator deployment agent (ADI) searches for the index k for which there exists a subsequent element for $Id_k$, for k varying between m and 1. If such a value of k does not exist, then the search process is terminated.

If such a value of k does exist, then the search process is applied to the identifiers $Id_i$, in the order k+1 through m for example, in order to progressively instantiate all the variables $\{V_1, \ldots, V_n\}$ and hence to calculate the identifiers $\{Id_1, \ldots, Id_m\}$.

The search process therefore makes it possible to calculate all the objects $\{Id_1, \ldots Id_n\}$ of the equation that represent an indicator.

The search process comprises a process for binding the variables, defined as follows, which makes it possible to determine the various variables of the identifiers Idi. Let Id be an object identifier in which the variables $\{W_1, \ldots W_k\}$ belong to the set $\{V_1, \ldots, V_n\}$ mentioned above. The identifier Id has the form $a_1.W_1.a_2.W_2. \ldots .a_k.W_{k \cdot ak+1}$, in which the coefficient $a_i$ have the structure of an object name in the ASN.1 sense of the term, which means that the coefficients ai are constituted by a sequence of positive integers.

Let j be the index for which the variables with successive indices $\{W_1, \ldots, W_j\}$ are already bound. Finding all of the objects that can be designated by this identifier consists of navigating through the instantiated MIB, searching for the objects, for example by launching a request of the SNMP "GetNextRequest" type, using as a parameter an object identifier whose identifiers begin with the root $R=a_1.W_1.a_2.W_2.\ldots.a_j.W_j$ and by applying an object identifier unifiability criterion, defined below. Let Id' be the response to the SNMP request GetNextRequest applied to the root R, if such an object exists. The object does not exist if the response to the request GetNextRequest indicates that the designated object does not exist, in which case the search is terminated.

If Id and Id' are unifiable according to the criterion defined below, then the variables $\{W_1, \ldots, W_k\}$ are all bound, which means that they all have a value, and we have just found the identifier of an object that can be designated by Id: Id'.

In order to find the next valid combination of the variables $\{W_1, \ldots, W_k\}$, knowing Id', it is necessary to reiterate the preceding process, using Id' as the starting point for the search, after having unbound, i.e., retrieved the previous values of, the variables $W_i$ that were not bound at the very beginning of the preceding search process.

If Id and Id' are not unifiable and the identifier Id' begins with R, then the search continues as before, using Id' as the starting point and unbinding any variable $W_i$ that was not bound at the very beginning of the preceding search process.

If Id' does not begin with R, then there is no longer any existing object whose identifier could be unified with Id. The search process is then terminated.

The unifiability criterion is defined as follows. Let Id' be a reference identifier (without a variable part) wherein all the elements are integer values; two identifiers Id and Id' are unifiable if both identifiers are the same size and if the identifiers $Id.a_i=Id'.a_i$ for any i belonging to [1, k+1]. Let $\{w_1, \ldots, w_k\}$ be the integer values of the identifier Id' that correspond to the variables $\{W_1, \ldots, W_k\}$ of Id, i.e. that are located at the same position in the corresponding identifier. The binding of the variables Wi takes place sequentially for indices varying between 1 and k through the following method:

if $W_i$ is bound, i.e., if $W_i$ already has a value, then this value must be equal to $w_i$; if the latter condition is not satisfied, then Id and Id' are not unifiable and the binding of the variables $\{W_1, \ldots W_k\}$ is not possible;

if $W_i$ is free, i.e., if $W_i$ does not yet have a value, then the variable $W_i$ will be bound to the value $w_i$.

For example, let $Id=1.2.3.W_1.4.5.W_2.6.7$ and $Id'=1.2.3.10.4.5.20.6.7$. These two object identifiers are unifiable for variables of $W_1$ and $W_2$ whose values are 10 and 20. On the other hand, if $Id=1.2.3.W_1.4.5.W_1.6.7$ and $Id'=1.2.3.10.4.5.20.6.7$, then Id and Id' are not unifiable because the variable $W_1$ cannot have the values 10 and 20 at the same time.

The identifier unification process makes it possible both to verify that two identifiers are unifiable and to determine for which values of the variables that are still free prior to the start of the unification process this unification is possible.

When the name resolution process has exhausted all the valid combinations, the indicator deployment agent (ADI) becomes unnecessary if the monitored configuration is never changed.

When the software and/or hardware configuration of the monitored machine can change, for example, according to the invention, when the predetermined maximum number of machines per subdomain has been reached, the indicator deployment agents are reactivated in order to re-evaluate the hardware and software configuration by performing a search for the instantiable elements, instantiating only those of the indicator agents that don't already exist, and deleting those that no longer have any reason to exist.

In a variant of embodiment, when the programming language is Java, the creation of a configuration agent, an indicator deployment agent or an indicator agent consists of sending an agent creation request "agentCreateRequest" to the "factory" agent of the agent machine that manages the subdomain in which the agent must be deployed. This request includes as parameters the identification of the agent and the status of the agent. The status of the agent corresponds to the serialized Java object of this agent. When the "factory" agent receives this request, it deserializes the serialized Java object and thereby obtains the requested agent.

Annex 1 provides exemplary implementations of various equations that make it possible to evaluate indicators.

Figure 2:
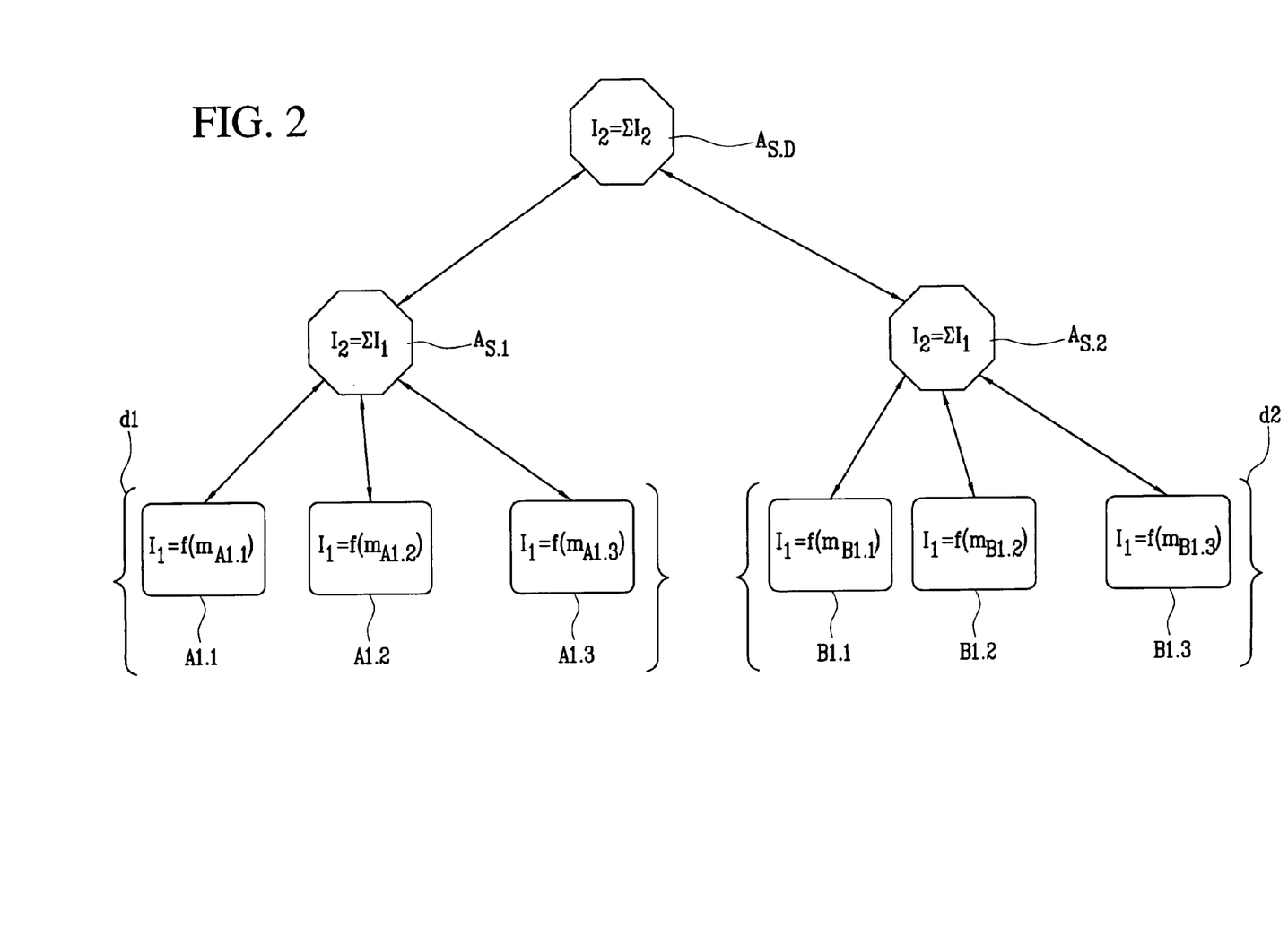
FIG. 2 represents an exemplary architecture of the links between monitoring agents according to the method of the invention.

FIG. 2 represents an exemplary architecture of the links between monitoring agents according to the method of the invention. A link is understood to mean an agent's subscription to another agent's subscriber list. In this figure, the resources have been abstracted. In essence, the chosen installation of the indicator agents and the synthesis agents depends on the distribution policy, i.e., the criteria of choice for determining which resource will be used as the calculation site for this or that indicator. The monitoring of a resource can actually be performed, for example, in the resource itself by installing the indicator agent or agents in this machine. However, it is possible to perform the monitoring of this same resource from another, remote resource in which the indicator agent or agents for this resource are installed. In this case, these remote indicator agents perform the measurements required for the evaluation of the indicators by querying SNMP-type agents installed in the resource to be monitored. Likewise, a resource can be the installation site for a plurality of synthesis nodes. In fact, the synthesis agents of these synthesis nodes can be managed by just one agent machine. Furthermore, this same agent machine can manage a plurality of indicator agents.

According to FIG. 2, the monitored domain comprises two subdomains (d1, d2). Each subdomain (d1, d2) comprises a given number of resources (not represented) monitored by a plurality of agents (A1.1, A1.2, A1.3, B1.1, B1.2, B1.3). In the exemplary embodiment represented in FIG. 2, each agent (A1.1, A1.2, A1.3, B1.1, B1.2, B1.3) calculates the same first indicator (I1), but in different resources. The indicator (I1) related to the agent (A1.1) is, for example, a function requiring the collection of a measurement ($m_{A1.1}$) on the resource associated with the respective agent (A1.1). For example, the indicator (I1) is determined by the formula indicating the number of alarms sent per minute sent a resource. Likewise, each indicator (I1) related to the other agents (A1.2, A1.3, B1.1, B1.2, B1.3) is a function requiring the collection of the respective measurements ($m_{A1.2}$, $m_{A1.3}$, $m_{B1.1}$, $m_{B1.2}$, $m_{B1.3}$) in each resource associated with each indicator agent (A1.2, A1.3, B1.1, B1.2, B1.3).

Each subdomain (d1, d2) comprises a first synthesis agent ($A_{S.1}$, $A_{S.2}$) responsible for evaluating a second indicator (I2). The formula of this indicator (I2) corresponds, for example, to the sum of the first indicators (I1) in the entire subdomain associated with the first synthesis agent ($A_{S.1}$, $A_{S.2}$). Thus, these two agents make it possible to know the number of alarms per minute sent by all of the resources of each subdomain (d1, d2). A second, supplementary synthesis agent ($A_{S.D}$) can also be installed and is designed to synthesize the information from all of the monitored domains. Consequently, this second synthesis agent ($A_{S.D}$) is responsible for evaluating a third indicator (I3). The formula of this third indicator (I3) corresponds to the sum of the second indicators (I2). This third indicator (I3) makes it possible to know the number of alarms per minute sent by all of the resources of the monitored domain.

During the configuration of the monitored domain represented in FIG. 2, each indicator agent (A1.1, A1.2, A1.3, B1.1, B1.2, B1.3) is first deployed in one or several resources, so as to be able to collect the respective measurements ($m_{A1.1}$, $m_{A1.2}$, $m_{A1.3}$, $m_{B1.1}$, $m_{B1.2}$, $m_{B1.3}$) required for the evaluation of the first indicator (I1) by each indicator agent (A1.1, A1.2, A1.3, B1.1, B1.2, B1.3). In a second step, the monitored domain is broken down into subdomains (d1, d2), and each agent (A1.1, A1.2, A1.3, B1.1, B1.2, B1.3) is assigned to a subdomain. In this step, the naming service (SN) updates the list (4) of associations, because the new indicator agents created are declared by the deployment agents using a procedure specific to the naming service by creating an association (indicatorName-domain-Name).

Next, the first synthesis agents are installed in each synthesis node associated with each subdomain (d1, d2). During its configuration, each first synthesis agent will subscribe to each indicator agent revealed by the notification (IndicatorLookupResp) as a result of the procedure described above. In the same way, the second synthesis agent ($A_{S.D}$) will subscribe to the first synthesis agents ($A_{S.1}$ $A_{S.2}$).

In Operation, the respective indicator agents will evaluate, for example periodically, the first indicator (I1) in each associated resource and transmit to the first synthesis agent ($A_{S.1}$ $A_{S.2}$), if necessary, the new value of the first indicator (I1). In the same way, the first synthesis agents ($A_{S.1}$ $A_{S.2}$) will evaluate the second indicator (I2) with the last values of the first indicator (I) received and transmit to the second synthesis agent ($A_{S.1}$ $A_{S.2}$), if necessary, the new value of the second indicator (I2). This second synthesis agent ($A_{S.D}$) also evaluates the third indicator (I3) with the last values of the second indicator (I2) received.

According to the invention, the monitoring method comprises a step for reorganizing the links between the various agents when the number of resources per subdomain reaches the predetermined maximum number.

Given the architecture of the links between indicator agents and synthesis agents, a modification of the monitored domain essentially involves the addition and/or deletion of at least one resource in at least one subdomain. In other words, a reorganization consists of modifying the subscriptions of the synthesis agents in the subscriber tables (1010, 1020, 2010) as a function of the assignment to this or that subdomain of the additional resource or resources.

The addition of a resource to a subdomain follows the following procedure.

First of all, new indicator agents are installed and configured in the new resource if the agents have not been previously installed. In essence, when a resource is moved from one subdomain (d1) to another subdomain (d2), there is no new installation of indicator agents, since they already exist.

Next, the configuration agent sends, to the naming service (SN) of the agent machine responsible for the supervision of the subdomain (di) to which the resource must be added, an agent addition notification (addToDomain) specifying the name of the subdomain and the name of the agent added. In response to this notification, the naming service searches for and determines all of the agents performing evaluations in the subdomain using the indicator evaluated by the new indicator agent. The naming service then sends, to each agent found, an object addition notification (addItem) that specifies the name of the agent added.

Each of the agents thus notified modifies its internal status and subscribes to the new indicator agent through a subscription notification (Subscribe), then recalculates its value as soon as possible.

The deletion of a resource from a subdomain follows the following procedure.

The naming service (SNi) of the subdomain (di) receives, from the entity that initiated the deletion of the resource, a deletion notification (removeFromDomain) that specifies the name of the domain in question as well as the name of the resource to be deleted. In response to this notification, the naming service (SNi) searches for and retrieves all of the agents performing evaluations in the subdomain using the indicator evaluated by the deleted indicator agent. The naming service (SNi) sends an object deletion notification (removeItem) that specifies the name of the deleted resource, thus allowing the agents to modify their status, to unsubscribe from the indicators, whose references will disappear, and to re-evaluate their value.

As soon as this phase is finished, the indicator agent thus disconnected can, for example, be included in another domain by means of the procedure for adding a resource.

It should be clear to those skilled in the art that the present invention allows for embodiments in many other specific forms without going beyond the scope of application of the invention as claimed. Consequently, the present embodiments should be considered as examples which can be modified within the range defined by the true spirit and scope of the invention as set forth in the attached claims to which resort should be made for a full and complete understanding of the full scope of the invention.

ANNEX 1

Exemplary implementation of an indicator named ifUtilizationBandWidth that does not refer to another indicator. The equation for this indicator is as follows:

```
class IfUtilizationBandWidth_Indicator extends PrimitiveIndicator
{
int delta_1=0;
public IfUtilizationBandWidth_Indicator( short serverId,
                                         String machineName,
                                         int period,
                                         Oid[ ] attributes,
                                         AgentId[ ] indicators
                                       )
        throws UnknownHostException, IOException
{
        super( serverId, machineName, period, attributes, indicators );
}
public AsnObject evaluate( long deltaT )
{
        int ifInOctets_1=((AsnUnsInteger)pairs[0].value).value;
        int ifOutOctets_1 =((AsnUnsInteger)pairs[1].value).value;
        int ifSpeed_1 =((AsnUnsInteger)pairs[2].value).value;
        int new_delta_1 = ifInOctets_1 + ifOutOctets_1;
        int old_delta_1 =delta_1;
        delta_1=new_delta_1;
        int newValue= ( ( ( ( 8 *(new_delta_1-old_delta_1) ) / (int) deltaT ) /
                        ifSpeed_1 ) * 100 );
        return( new AsnInteger( newValue ) );
```

-continued

```
  }
}
public class IfUtilizationBandWidth_Deployer extends
IndicatorDeployer
  {
    private static String ind_patterns[ ]={
        Mib2.ifInOctetst + ".1",
        Mib2.ifOutOctets + ".1",
        Mib2.ifSpeed + ".1"
  };
    private static IndicatorReferencel[ ] ind_indicators=null;
    private static int            ind_period=1;
    public IfUtilizationBandWidth_Deployer( short serverId,
                                            String machineName,
                                            String[ ] machines
                                          )
      throws Exception
    {   super(serverId, machineName, ind_patterns, machines);
        this.serverId = serverId;
        this.machineName=machineName;
        this.period=ind_period;
        indicatorNames=ind_indicators;
    }
    protected PrimitiveIndicator createInstance( short serverId,
                                                 String machineName,
                                                 int period,
                                                 Oid[ ] attributes,
                                                 AgentId[ ] indicators
                                               )
      throws UnknownHostException, IOException
    {   return( new IfUtilizationBandWidth_Indicator( serverId,
                                                      machineName,
                                                      period, attributes,
                                                      indicators));
    }
  }
}
```

This equation uses instantiated indicators ifInOctets.1, ifOutOctets.1 and ifSpeed.1, the names of which are stored in a table used by the builder.

The evaluation of this equation is performed by a generic method called "evaluate".

Exemplary implementation of the indicator named ifErrorsRatio when it refers to three other indicators, i.e. ifErrors.1, IfInPackets1 and IfOutPackets1. The equation for this indicator is as follows

```
class IfErrorsRatio_Indicator extends PrimitiveIndicator
{
    public IfErrorsRatio_Indicator(       short serverId,
                                          String machineName,
                                          int period,
                                          Oid[ ] attributes,
                                          AgentId[ ] indicators
                                  )
        throws UnknownHostException, IOException
    {
        super( serverId, machineName, period, attributes, indicators );
    }
    public AsnObject evaluate( long deltaT)
    {
        int IfErrors=((AsnInteger) indicatorValues[0]).value;
        int IfInpackets=((AsnInteger) indicatorValues[1]).value;
        int IfOutpackets=((AsnInteger) indicatorValues[2]).value;
        int newValue= ( IfErrors / ( IfInpackets + IfOutpackets ) );
        return( new AsnInteger( newValue ) );
    }
}
public class IfErrorsRatio_Deployer extends IndicatorDeployer
{
    private static String ind_patterns[ ]=null;
    private static IndicatorReference[ ] ind_indicators= {
        new IndicatorReference( "IfErrors_Indicator"),
        new IndicatorReference( "IfInpackets_Indicator"),
        new IndicatorReference( "IfOutpackets_Indicator")
    };
    private static int ind_period = 100;
    public IfErrorsRatio_Deployer(        short serverId,
                                          String machineName,
                                          String[ ] machines
                                 )
        throws Exception
    {
    super(serverId, machineName, ind_patterns, machines);
    this.serverId = serverId;
    this.machineName=machineName;
    period=ind_period;
    indicatorNames=ind_indicators;
    }
    protected PrimitiveIndicator createInstance(   short serverId,
                                                   String machineName,
                                                   int period,
                                                   Oid[ ] attributes,
                                                   AgentId[ ] indicators)
        throws UnknownHostException, IOException
    {
        return( new IfErrorsRatio_Indicator(   serverId,
    machineName,
    period,
    attributes,
    indicators));
    }
}
```

Exemplary implementation of a new iterator, for example SUM, corresponding to a

```
public class Sum extends CompoundIndicator
{
    public Sum( int period, String[ ] machines, Class klass )
    {
        super( period, machines, klass );
    }
    public AsnObject evaluate( long deltaT )
    {
        int length = indicatorValues.length;
        int current = 0;
        for( int i = 0; i < length; i++ )
        {
            if( indicatorValues[i] != null )
            {
                current += ((AsnInteger) indicatorValues[i]).value;
            };
        };
        return( new AsnInteger( current ) );
    }
}
```

The invention claimed is:

1. A method for scalable monitoring of a computer system comprising a plurality of computer units constituting hardware resources to be monitored forming a monitored domain, and a manager comprising a central computer system connected to a communication network that allows transfer of information between at least one of the resources and the manager, said resources including memories and having installed therein indicator agents, the method comprising:

organizing the monitored domain into a plurality of monitored subdomains (d1, d2) comprising a predetermined maximum number of resources (A1, A2, B1, B2), providing a plurality of indicators, said indicators representing an operational status of the resources of a subdomain, specifying the subdomain(s) of the computer system in which each indicator should be deployed, automatically creating and configuring, for each subdomain, an information synthesis node comprising at least one synthesis agent stored in a memory of a resource, providing said resources with indicator agents for evaluating said indicators, each indicator agent being uniquely identified by the name of the indicator the indicator agent calculates and by the subdomain in which said indicator agent is installed, for each subdomain, associating each indicator agent with each synthesis agent using the corresponding indicator value, the structure of each synthesis agent being identical to that of an indicator agent, for each subdomain, using indicator agents for calculating and storing indicator values in the memory of at least one resource, synthesizing by each synthesis agent said stored indicator values to define corresponding indicators, and modifying the associations between the synthesis agents and the indicator agents when the predetermined maximum number of resources in a subdomain is reached, in order to accommodate the addition or deletion of indicators so that the monitored domain comprises a new architecture having, in each subdomain, a number of resources lower than the predetermined maximum number of resources.

2. A method for scalable monitoring of a computer system according to claim 1, wherein the configuring an information synthesis node comprises, for each synthesis agent:

searching, in a table stored in the memory of a resource, for the name of the indicator agent or agents required to calculate the indicator of the synthesis agent, and subscribing the synthesis agent to the indicator agents identified during the searching, said subscribing allowing each synthesis agent to automatically receive, in a corresponding subscription table stored in the storage means of a resource, the new values of the indicators found.

3. A method for scalable monitoring of a computer system according to claim 2, wherein the searching comprises:

sending notification by the synthesis agent to a naming service dedicated to storing the associations between a subdomain name, an indicator agent and an indicator, said notification comprising the name of a given subdomain and a given indicator.

4. A method for scalable monitoring of a computer system according to claim 1, wherein the modifying the associations comprises:

installing at least one indicator agent in each new resource added to a subdomain, sending, to the synthesis agents requiring the value of the indicator of the new indicator agent or agents, a notification comprising the identification of the new indicator agent or agents, and subscribing each synthesis agent to the new indicator agents required to calculate the indicator of the synthesis agent.

5. A method for scalable monitoring of a computer system according to claim 2, wherein the modifying the associations comprises:

installing at least one indicator agent in each new resource added to a subdomain, sending, to the synthesis agents requiring the value of the indicator of the new indicator agent or agents, a notification comprising the identification of the new indicator agent or agents, and subscribing each synthesis agent to the new indicator agents required to calculate the indicator of the synthesis agent.

6. A method for scalable monitoring of a computer system according to claim 3, wherein the modifying the associations comprises:

installing at least one indicator agent in each new resource added to a subdomain, sending, to the synthesis agents requiring the value of the indicator of the new indicator agent or agents, a notification comprising the identification of the new indicator agent or agents, and subscribing each synthesis agent to the new indicator agents required to calculate the indicator of the synthesis agent.

7. A method for scalable monitoring of a computer system according to claim 1, wherein the modifying the association comprises:

selecting, for each subdomain, the resources to be deleted, sending, to the synthesis agents using the value of the indicator of the indicator agent or agents installed in the selected resource or resources, a notification comprising the identification of the deleted indicator agent or agents, and unsubscribing the synthesis agents from the indicator agents whose indications are contained in the notification.

8. A method for scalable monitoring of a computer system according to claim 2, wherein the modifying the associations comprises:

selecting, for each subdomain, the resources to be deleted, sending, to the synthesis agents using the value of the indicator of the indicator agent or agents installed in the selected resource or resources, a notification comprising the identification of the deleted indicator agent or agents, and unsubscribing the synthesis agents from the indicator agents whose indications are contained in the notification.

9. A method for scalable monitoring of a computer system according to claim 3, wherein the modifying the associations comprises:

selecting, for each subdomain, the resources to be deleted, sending, to the synthesis agents using the value of the indicator of the indicator agent or agents installed in the selected resource or resources, a notification comprising the identification of the deleted indicator agent or agents, and unsubscribing the synthesis agents from the indicator agents whose indications are contained in the notification.

10. A method for scalable monitoring of a computer system according to claim 4, wherein the modifying the associations comprises:

selecting, for each subdomain, the resources to be deleted, sending, to the synthesis agents using the value of the indicator of the indicator agent or agents installed in the selected resource or resources, a notification comprising the identification of the deleted indicator agent or agents, and unsubscribing the synthesis agents from the indicator agents whose indications are contained in the notification.

11. A method for scalable monitoring of a computer system according to claim 5, wherein the modifying the associations comprises:
   selecting, for each subdomain, the resources to be deleted,
   sending, to the synthesis agents using the value of the indicator of the indicator agent or agents installed in the selected resource or resources, a notification comprising the identification of the deleted indicator agent or agents, and
   unsubscribing the synthesis agents from the indicator agents whose indications are contained in the notification.

12. A method for scalable monitoring of a computer system according to claim 6, wherein the modifying the associations comprises:
   selecting, for each subdomain, the resources to be deleted,
   sending, to the synthesis agents using the value of the indicator of the indicator agent or agents installed in the selected resource or resources, a notification comprising the identification of the deleted indicator agent or agents, and
   unsubscribing the synthesis agents from the indicator agents whose indications are contained in the notification.

13. A method for scalable monitoring of a computer system according to claim 1, further comprising determining the maximum number of resources per subdomain to minimize the cost of calculating the indicators, or the number of synthesis nodes.

14. A method for scalable monitoring of a computer system according to claim 2, further comprising determining the maximum number of resources per subdomain to minimize the cost of calculating the indicators, or the number of synthesis nodes.

15. A method for scalable monitoring of a computer system according to claim 3, further comprising determining the maximum number of resources per subdomain to minimize the cost of calculating the indicators, or the number of synthesis nodes.

16. A method for scalable monitoring of a computer system according to claim 4, further comprising determining the maximum number of resources per subdomain to minimize the cost of calculating the indicators, or the number of synthesis.

17. A method for scalable monitoring of a computer system according to claim 7, further comprising determining the maximum number of resources per subdomain to minimize the cost of calculating the indicators, or the number of synthesis.

18. A method for scalable monitoring of a computer system according to claim 8, further comprising determining the maximum number of resources per subdomain to minimize the cost of calculating the indicators, or the number of synthesis nodes.

19. A method for scalable monitoring of a computer system according to claim 9, further comprising determining the maximum number of resources per subdomain to minimize the cost of calculating the indicators, or the number of synthesis nodes.

20. A method for scalable monitoring of a computer system according to claim 10, further comprising determining the maximum number of resources per subdomain to minimize the cost of calculating the indicators, or the number of synthesis nodes.

21. A device for the scalable monitoring of a computer system comprising:
   a plurality of computer units constituting hardware resources to be monitored and forming a monitored domain, said resources including memories having stored therein indicator agents,
   means for organizing the monitored domain into monitored subdomains comprising a predetermined maximum number of resources,
   a plurality of indicators characterizing the status or the operation of one or more resources of the computer system, each indicator agent being adapted for evaluating an indicator, each indicator agent being uniquely identified by the name of the indicator said indicator agent calculates and by the subdomain in which the indicator agent is installed,
   means for creating and configuring, in a memory of at least one resource, information synthesis nodes comprising at least one synthesis agent stored in said memory of at least one resource to define corresponding indicators, the structure of each synthesis agent being identical to that of an indicator agent so as to evaluate corresponding defined indicators the configuration of a synthesis agent comprising the storage, in the memory of a resource, of the associations between the synthesis agent and indicator agents, and
   means for modifying the associations between the synthesis agents and the indicator agents when the predetermined maximum number of resources in a subdomain is reached, so that the new architecture of the monitored domain comprises, in each subdomain, a number of resources lower than the predetermined maximum number of resources.

22. A scalable monitoring device for scalable monitoring of a computer system according to claim 21, wherein said means for configuring a synthesis node comprises means for searching, in a table stored in the memory of a resource, for the name of the indicator agent or agents required to calculate the indicator of the synthesis agent, and means for subscribing the synthesis agent to the indicator agents identified by the means for searching; said means for subscribing allowing each synthesis agent to automatically receive, in a synthesis agent subscription table stored in the memory of a resource, new values of the indicators found.

23. A scalable monitoring device for scalable monitoring of a computer system according to claim 22, wherein said search means comprises means for sending a notification by the synthesis agent to a naming service dedicated to storing, in a table stored in the memory of a resource, the associations between a subdomain name, an indicator agent and an indicator, said notification comprising the name of a given subdomain and a given indicator, and means for sending a notification by the naming service to the requesting synthesis agent, of the name of the indicator agent or agents corresponding to the association of the given subdomain and the given indicator.

24. A scalable monitoring device for scalable monitoring of a computer system according to claim 21, wherein said modification means comprises means for creating and storing at least one indicator agent in each new resource added to a subdomain, means for sending, to the synthesis agents requiring the value of the indicator of the new indicator agent or agents, a notification comprising the identification of the new indicator agents or agents, and means for subscribing each synthesis agent to the new indicator agents required to calculate the indicator of the synthesis agent.

25. A scalable monitoring device for scalable monitoring of a computer system according to claim 22, wherein said modification means comprises means for creating and storing at least one indicator agent in each new resource added to a subdomain, means for sending, to the synthesis agents requiring the value of the indicator of the new indicator agent or agents, a notification comprising the identification of the new indicator agents or agents, and means for subscribing each synthesis agent to the new indicator agents required to calculate the indicator of the synthesis agent.

26. A scalable monitoring device for scalable monitoring of a computer system according to claim 13, wherein said modification means comprises means for creating and storing at least one indicator agent in each new resource added to a subdomain, means for sending, to the synthesis agents requiring the value of the indicator of the new indicator agent or agents, a notification comprising the identification of the new indicator agents or agents, and means for subscribing each synthesis agent to the new indicator agents required to calculate the indicator of the synthesis agent.

27. A scalable monitoring device for scalable monitoring of a computer system according to claim 21, wherein said modification means comprises means for selecting, for each subdomain of the resources to be deleted, means for sending, to the synthesis agents using the value of the indicator of the indicator agent or agents installed in the selected resource or resources, a notification comprising the identification of the deleted indicator agent or agents, and means for unsubscribing the synthesis agents from the indicator agents whose identifications are contained in the notification.

28. A scalable monitoring device for scalable monitoring of a computer system according to claim 22, wherein said modification means comprises means for selecting, for each subdomain of the resources to be deleted, means for sending, to the synthesis agents using the value of the indicator of the indicator agent or agents installed in the selected resource or resources, a notification comprising the identification of the deleted indicator agent or agents, and means for unsubscribing the synthesis agents from the indicator agents whose identifications are contained in the notification.

29. A scalable monitoring device for scalable monitoring of a computer system according to claim 23, wherein said modification means comprises means for selecting, for each subdomain of the resources to be deleted, means for sending, to the synthesis agents using the value of the indicator of the indicator agent or agents installed in the selected resource or resources, a notification comprising the identification of the deleted indicator agent or agents, and means for unsubscribing the synthesis agents from the indicator agents whose identifications are contained in the notification.

30. A scalable monitoring device for scalable monitoring of a computer system according to claim 24, wherein said modification means comprises means for selecting, for each subdomain of the resources to be deleted, means for sending, to the synthesis agents using the value of the indicator of the indicator agent or agents installed in the selected resource or resources, a notification comprising the identification of the deleted indicator agent or agents, and means for unsubscribing the synthesis agents from the indicator agents whose identifications are contained in the notification.

31. A scalable monitoring device for scalable monitoring of a computer system according to claim 21, further comprising means for determining the maximum number of resources per subdomain for minimizing the cost of calculating the indicators, or the number of synthesis nodes.

32. A scalable monitoring device for scalable monitoring of a computer system according to claim 24, further comprising means for determining the maximum number of resources per subdomain for minimizing the cost of calculating the indicators, or the number of synthesis nodes.

33. A scalable monitoring device for scalable monitoring of a computer system according to claim 27, further comprising means for determining the maximum number of resources per subdomain for minimizing the cost of calculating the indicators, or the number of synthesis nodes.

* * * * *